UNITED STATES PATENT OFFICE.

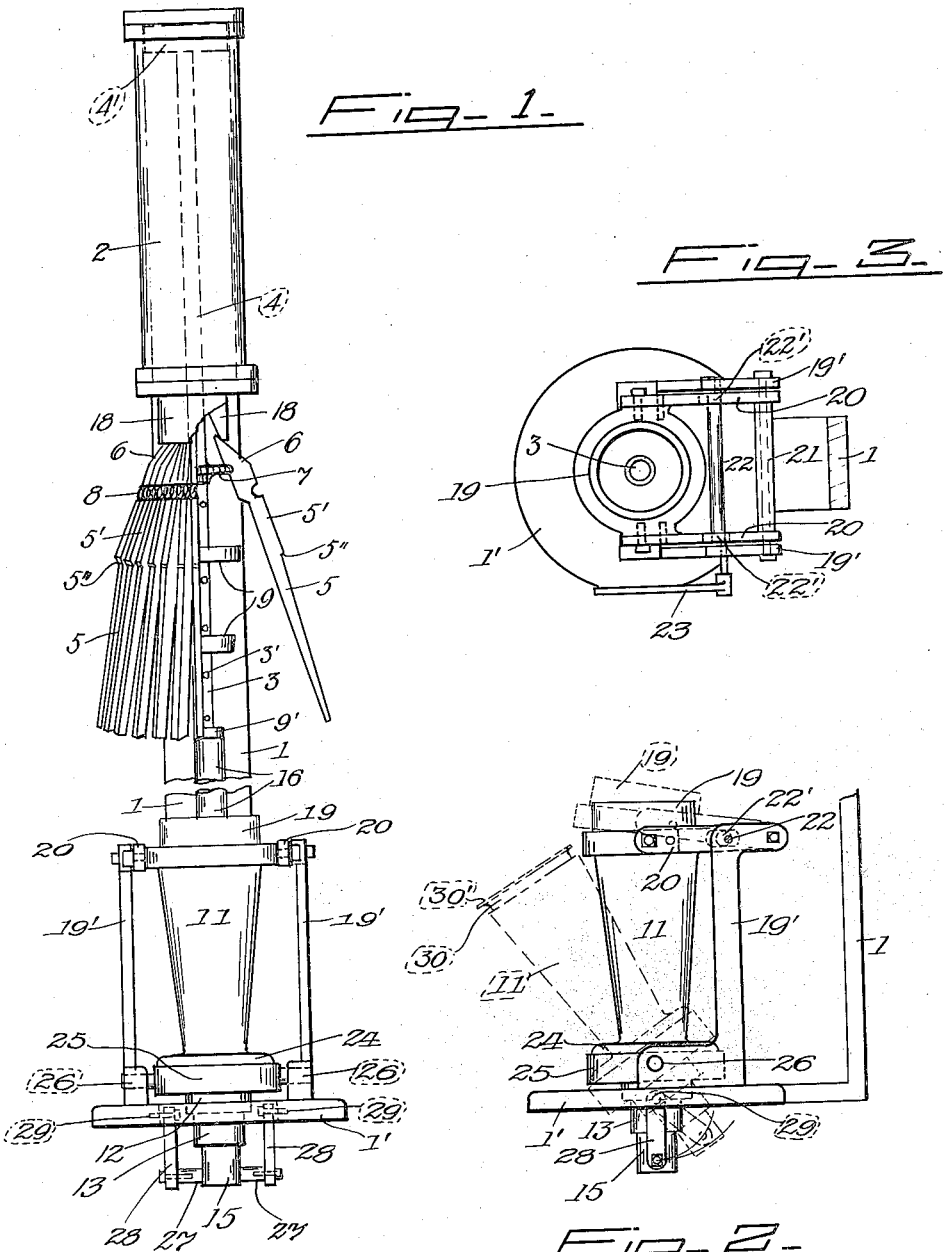

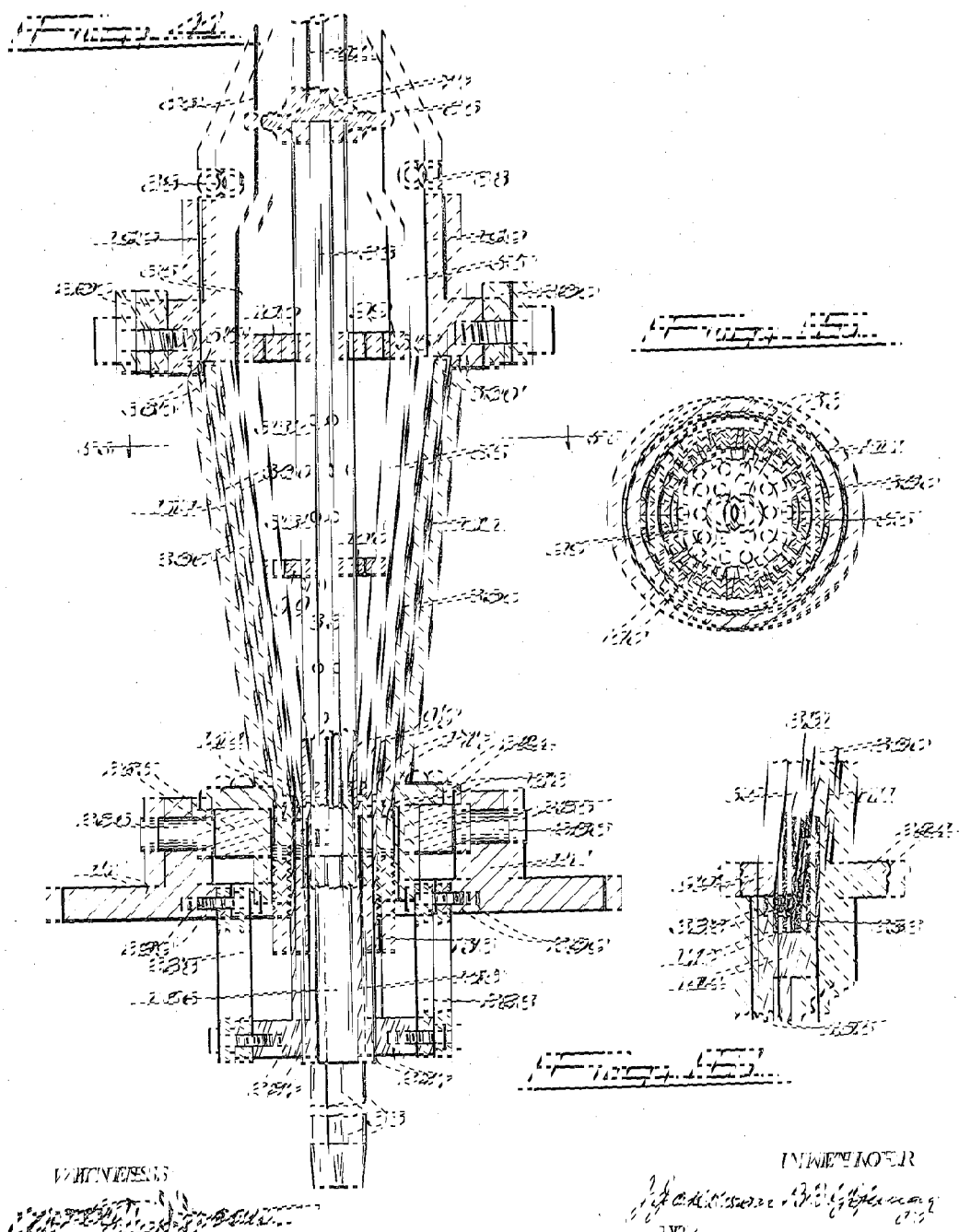

JACKSON B. YOUNG, OF OAKLAND, CALIFORNIA.

MACHINE FOR MAKING HOLLOW WARE FROM PULP.

1,285,546.                Specification of Letters Patent.         Patented Nov. 19, 1918.

Application filed November 24, 1917. Serial No. 203,825.

*To all whom it may concern:*

Be it known that I, JACKSON B. YOUNG, a citizen of the United States, residing at Oakland, in the county of Alameda and State of California, have invented certain new and useful Improvements in Machines for Making Hollow Ware from Pulp, of which the following is a specification.

My invention relates to the class of machines for making hollow-ware from pulp, particularly conical shapes and especially milk-bottles.

In a previous Patent No. 1244820 issued to me October 30, 1917, I have disclosed a machine for this purpose in which a tapered inner mold composed of a circumferential series of swinging fingers moves into and out of a tapered outer mold.

My present invention relates in general to this machine, and it consists in part in certain improvements in the tapered outer mold by means of which it is enabled to swing to one side, after the inner mold is lifted out, and by reason of said movement, the molded product is projected from the outer mold sufficiently to permit it to be lifted out. It consists further in a removable liner-form initially placed within said outer mold and upon which the pulp is molded, said liner-form with its clinging molded product being projected by the swinging of the outer mold from said mold, so that they both can be lifted out completely from said mold, and a fresh liner-mold substituted.

My invention also consists in a machine for this purpose, having an independent liner-form within the outer mold, adapted for removal with the product molded upon it.

In describing my present machine as improved, I shall necessarily have to describe and illustrate in some detail, much that is set forth in the previous patent above referred to.

Referring to the accompanying drawings—

Figure 1 is a side elevation, broken, of the machine, showing the inner mold lifted from the outer mold, the fingers of the inner mold being spread for cleansing effect, and some of the fingers being omitted for the sake of clearness.

Fig. 2 is an elevation of the outer mold, the dotted lines showing the position to which it is swung to permit the removal of the liner-form and its contained pulp-product.

Fig. 3 is a top plan view of the outer mold.

Fig. 4 is a vertical sectional view, enlarged, of the two molds showing them in functional position.

Fig. 5 is a cross section on the line 5—5 of Fig. 4.

Fig. 6 is an enlarged detail section showing the effect of the molds in forming the neck of the bottle.

In Fig. 1, the frame 1 is surmounted by a pressure cylinder 2 which may indicate any suitable means for carrying and operating the inner mold. This is effected through the tubular axis-rod 3 of the inner mold, said rod or an extension 4 thereof passing up into the cylinder as shown by the dotted lines and having a piston 4' on its upper end.

It is not necessary to show herein the fluid pressure connections of the cylinder as these form no part of the invention, the illustration being ample to indicate the essential fact of the reciprocative movement of the inner mold. The said inner mold is composed of independent fingers 5, suitably beveled to present when lying together in circumferential series the tapering shape of an inverted truncated cone. The heads 5' of these fingers are straight, that is non-tapering, and they meet the tapered portions on a shoulder 5". The upper ends of the heads 5' are beveled at 6. The fingers are connected with the axis-rod 3 by a collar 7 on said rod. On this collar the heads 5' of the fingers freely fulcrum for swinging movement, and they are encircled by a spring 8, the tendency of which is to hold the fingers 5 in taper-mold shape.

9 are supports carried by the axis-rod 3, and against which the fingers bear when together, as seen in Fig. 4. The lowermost support 9' is imperforate and serves as a closure for the inner-mold end, but the other supports are perforated, as shown at 10 in Fig. 4, for drainage of the excluded water surplus from the material, into the hollow rod 3 through holes 3' in said rod.

11 is the outer mold. This is carried by the lower end 1' of the frame 1 and has the tapering shape of an inverted truncated cone, corresponding to the functional shape of the inner mold. The foot 12 of the outer mold is cylindrical and has fitted to it a foot sleeve 13, see Fig. 4. Fitted to and slidable within the cylindrical foot 12 of the outer mold is the annular end-abutment 14, forming the bottom closure for the mold space. The guide stem 15 of the abutment passes down through the sleeve 13 and said stem is adapted to be closed by the plug-extension 16 of the axis rod 3 of the inner mold, as will be presently described. The upper face of the end-abutment 14 is formed with a rabbet 17 about its edge.

Under the base of the cylinder 2, as seen in Fig. 1, is a fixed contact sleeve 18, see Fig. 1, for spreading the fingers of the inner mold. On top of the outer mold and supported by a frame 19', is the hopper 19 which coacts with the straight-head portions 5' of the inner mold fingers to impose a direct downward pressure on top of the material.

This hopper 19 fits down over the top of the outer mold and is adjustable to and from its seat thereon, for a purpose to be presently described. To effect this adjustment, said hopper, as shown particularly in Figs. 2 and 3, is carried by side arms or links 20, the outer ends of which are pivoted on a cross pin 21 carried in the upper ends of the frame supports 19'. A rock shaft 22 is mounted in the frame supports 19', and said shaft is formed with eccentric cross sections at 22' where it passes through the arms or links 20 of the hopper 19. A lever 23 mounted on the end of the rock-shaft 22, enables said shaft to be rocked, with the effect of causing its eccentrics 22' to depress the arms 20 and carry the hopper down to its seat upon top of the outer mold, as shown in Figs. 4 and 2, or to lift said arms to elevate the hopper from its seat, as shown by the dotted lines in Fig. 2, thereby freeing the top of the outer mold, so that the latter may be swung to one side, as will now be described.

The foot of the outer mold is formed with a flange 24, which is bolted down on a plate 25, provided with trunnions 26 mounted to rock in the lower end 1' of the main frame 1. Thus the outer mold may be swung to one side about the trunnions 26 as a center, as shown by the dotted lines in Fig. 2, and when so swung, the hopper having been elevated as described to free its top, the pressed product within said mold may be removed.

A further elaboration of this movement of the outer mold is as follows:—

If, by and during said movement, the end abutment 14, upon which the molded product rests, be elevated, it will have the effect of simultaneously loosening and lifting the molded product so that its upper end will be slightly projected from the top of the mold and may be taken hold of to readily remove it. To effect this, it will be seen by reference to Fig. 4, particularly, that the guide stem 15 of the abutment 14 is provided with lugs 27, to the ends of which are pivoted links 28, the other ends of which are pivoted at 29 to the lower end 1' of the main frame 1. Owing now, to the different pivotal centers of the trunnions 26 and the links 28, it follows that when the outer mold is moved out to the position of the dotted lines in Fig. 2, the links 28 will cause the elevation of the end abutment 14 with the effect intended.

Molded products of the nature herein described are very sticky until they become dry. It has been found impracticable to dry them in the molds, and they cannot well be removed until they are dry. An important feature of the present invention relates to this problem, and solves it by the provision of a removable liner-form, within which the molded product is formed. Referring to Figs. 4, 5 and 6, it will be seen that there is freely and removably fitted to the inner surface of the outer mold a liner-form 30. This form is flanged at its upper end at 30' and rests on top of the outer mold so that when the hopper 19 is in place the form is firmly held; the lower end of the liner-form and the molded product rest on the end abutment 14. Now when the end-abutment is lifted, as has been described, it lifts the liner-form with its contained molded-product, and projects its upper end, as seen by the dotted lines, in Fig. 2. The form with its product is then lifted out and laid aside, until the product is dry enough for easy removal. Meanwhile another liner-form is placed in the mold.

The operation of the machine is as follows:—When the parts are in the position shown in Fig. 1, the inner mold fingers 5, by contact with the sleeve 18 have been spread in order to clear them of any particles of adhering material if such cling to them. The inner mold is now lowered, and immediately, by breaking the contact with the sleeve 18, the fingers 5 are closed together by the spring 8 to functional taper shape. When the mold has descended a distance sufficient to cause the plug extension 16 of the axis rod 3 to enter and close the stem 15 of the annular end-abutment 14' and before the fingers 5 reach the hopper 19 of the outer mold, the pulp is poured into the top of said hopper, until it fills the outer mold and said hopper. Then the inner mold descends into the hopper 19 and outer mold 11. Until the shoulder 5" of the inner-mold head reaches the top of the hopper 19, the fluidic contents displaced by the entering mold, overflows, if sufficient volume be present, the top of said hopper. The holding capacity of the outer mold 11 and hopper 19 and the displacement of the inner mold are so proportioned that when the shoulder 5'' of the inner mold head reaches the top of the hopper 19, there will remain in the outer mold just enough pulp to make the product intended. The lower end of the inner mold being closed by the imperforate bottom support 9', said mold, will, as it continues down, force the pulp to fill the space between the two molds, all the way up to the descending shoulder 5''. As the descent continues, the mold space gradually grows thinner and shapes the product, the shoulder 5'' pressing down upon and condensing the upper end of the product, and the end-abutment 14 below, shaping and condensing its other end. The whole pressure is complete when the head-shoulder 5'' reaches the top of the tapered outer mold. The surplus water during this operation is squeezed inwardly between the mold-fingers 5 and drains out through the perforated axis rod 3 and its open ended hollow plug extension 16.

In the operation, the end-abutment 14 with its rabbet 17, forms, as shown in Fig. 6, a neck for the molded product 31, which neck comprises an inner-flange 32 and a cylindrical extension 33.

It must be explained that the article thus formed is upside down for its use as a milk-bottle, and, therefore, the end last described forms an efficient neck, in which, upon the flange 32, a cover may be laid. The other or larger end of the article is of course open when taken from the machine, and must have its bottom applied in some manner with which the present invention is not concerned. When the molding is complete, the inner mold is lifted out, and when the beveled extremities 6 of its finger heads reach the fixed contact sleeve 18, the fingers 5 are separately but in unison thrown outwardly, as shown in Fig. 1, which movement effectually clears them of any material which may cling to them.

It is found, in practice, that the inner mold formed as described of a multiplicity of swinging fingers will not only act as a sieve to permit the passage of the excluded water but will also act to admit air to break the more or less intimate suction contact of the fingers and molded product, so that the mold may be easily withdrawn.

Very little, if any, particles of the material cling to the fingers when withdrawn, but if such be present, the spreading of the fingers serves to detach them, so that the inner mold is always clean, a factor of importance in this work.

When the inner mold is lifted out, the hopper 19 is lifted off the top of the outer mold, and said mold is swung to one side. This movement as heretofore described, results in projecting the liner-form 30 with its contained molded product, and said form may be lifted out and set aside, until the product is sufficiently dried, for easy removal. A fresh liner-form is then fitted to the mold, the latter is swung back to place, the hopper depressed to its seat, and the general operation is repeated.

I claim:—

1. A machine for the described purpose comprising tapered outer and inner molds, relatively movable to compress the material between them; a movable end-abutment closing the mold space; means for swinging the outer mold to one side when freed from the inner mold; and means actuated by the swinging movement of the outer mold to lift the end abutment to project the contents of said outer mold.

2. A machine for the described purpose comprising tapered outer and inner molds, relatively movable to compress the material between them; a movable end-abutment closing the mold space; means for swinging the outer mold to one side when free from the inner mold; means actuated by the swinging movement of the outer mold to lift the end abutment to project the contents of said outer mold; a hopper for the outer mold; and means for swinging said hopper to and from its seat on the outer mold.

3. A machine for the described purpose comprising tapered outer and inner molds, relatively movable to compress the material in the space between them; a movable end abutment closing the mold space; an independent liner-form removably seated in the mold space; means for swinging the outer mold to one side when freed from the inner mold; and means actuated by the swinging movement of the outer mold to lift the end abutment, whereby the molded product and the liner form to which said product clings are projected from the outer mold.

4. A machine for the described purpose comprising tapered outer and inner molds, relatively movable to compress the material in the space between them; a movable end abutment closing the mold space; an independent liner-form having a top flange by which said form is suspended from the top of the outer mold within the mold space; means for swinging the outer mold to one side when freed from the inner mold; means actuated by the swinging movement of the outer mold to lift the end abutment, whereby the molded product and the liner form to which said product clings are projected from the outer mold; a hopper for the outer mold; and means for swinging the hopper to and from its seat on the outer mold and the flanged top of the liner-form.

5. A machine for the described purpose comprising tapered outer and inner molds, relatively movable to compress the material in the space between them; a movable end-abutment closing the mold space; an independent liner-form removably seated in the mold space, and resting on the end-abutment; means for swinging the outer mold to one side when freed from the inner mold; and means actuated by the swinging movement of the outer mold to lift the end abutment and project the liner-form with its molded product from the outer mold.

6. A machine for the described purpose comprising tapered outer and inner molds, relatively movable to compress the material in the space between them; a movable end-abutment closing the mold space; an independent liner-form removably seated in the mold space, and resting on the end-abutment; means for swinging the outer mold to one side when freed from the inner mold; means actuated by the swinging movement of the outer mold to lift the end abutment and project the liner-form with its molded product from the outer mold; a hopper for the outer mold, and means for swinging the hopper to and from its seat on the outer mold.

7. A machine for the described purpose comprising a tapered outer mold; a tapered inner mold formed of a circumferential series of swinging fingers; means for moving the inner mold into and out of the outer mold to compress the material in the space between the two molds and to relieve it; a movable end-abutment closing the mold space; means for swinging the outer mold to one side when freed from the inner mold; and means actuated by the swinging movement of the outer mold to lift the end abutment to project the contents of said outer mold.

8. A machine for the described purpose comprising a tapered outer mold; a tapered inner mold formed of a circumferential series of swinging fingers; means for moving the inner mold into and out of the outer mold to compress the material in the space between the two molds and to relieve it; a movable end-abutment closing the mold space; means for swinging the outer mold to one side when freed from the inner mold; means actuated by the swinging movement of the outer mold to lift the end abutment to project the contents of said outer mold; a hopper for the outer mold; and means for swinging said hopper to and from its seat on the outer mold.

9. A machine for the described purpose comprising a tapered outer mold; a tapered inner mold formed of a circumferential series of swinging fingers; means for moving the inner mold into and out of the outer mold to compress the material in the space between the two molds and to relieve it; a movable end-abutment closing the mold space; an independent liner-form removably seated in the mold space; means for swinging the outer mold to one side when freed from the inner mold; and means actuated by the swinging movement of the outer mold to lift the end abutment and project the liner-form with its molded product from the outer mold.

10. A machine for the described purpose comprising a tapered outer mold; a tapered inner mold formed of a circumferential series of swinging fingers; means for moving the inner mold into and out of the outer mold to compress the material in the space between the two molds and to relieve it; a movable end-abutment closing the mold space; an independent liner-form removably seated in the mold space; means for swinging the outer mold to one side when freed from the inner mold; means actuated by the swinging movement of the outer mold to lift the end abutment and project the liner-form with its molded product from the outer mold; a hopper for the outer mold, and means for swinging the hopper to and from its seat on the outer mold.

In testimony whereof I have signed my name to this specification in the presence of two subscribing witnesses.

JACKSON B. YOUNG.

Witnesses:
Wm. F. Booth,
D. B. Richards.